United States Patent [19]

Alperin

[11] Patent Number: 4,473,186

[45] Date of Patent: Sep. 25, 1984

[54] METHOD AND APPARATUS FOR SPRAYING

[76] Inventor: Morton Alperin, 6000 Lockhurst Dr., Woodland Hills, Calif. 91367

[21] Appl. No.: 367,432

[22] Filed: Apr. 12, 1982

[51] Int. Cl.³ .......................... B05B 7/14; B05B 7/24; F04F 5/16; F04F 5/44

[52] U.S. Cl. ........................................ 239/8; 239/308; 239/379; 239/419.3; 239/419.5; 239/422; 239/424; 239/427.5; 417/54

[58] Field of Search ................... 239/8, 310, 318, 311, 239/419.3, 419.5, 422–424, 427.3, 427.5, 428, 308, 379; 417/54

[56] References Cited

U.S. PATENT DOCUMENTS

| | | | |
|---|---|---|---|
| 3,298,669 | 1/1967 | Zingg | 239/318 |
| 3,333,601 | 8/1967 | Lofgreen | 239/318 |
| 3,688,511 | 9/1972 | Harmstrof | 239/318 X |
| 3,958,758 | 5/1976 | Piorkowski | 239/427.5 X |
| 4,332,529 | 6/1982 | Alperin | 417/54 |

*Primary Examiner*—Andres Kashnikow
*Attorney, Agent, or Firm*—Edward J. DaRin

[57] ABSTRACT

A method and apparatus for dissemination of a spray substance comprising small liquid or solid particles or a jet stream and projecting it over large distances from the device. The apparatus comprises either conventional ejectors or jet diffuser ejectors including means for introduction of liquid or solid spray substances into various regions of the ejector to provide a capability for handling substances of various physical and chemical characteristics.

23 Claims, 5 Drawing Figures

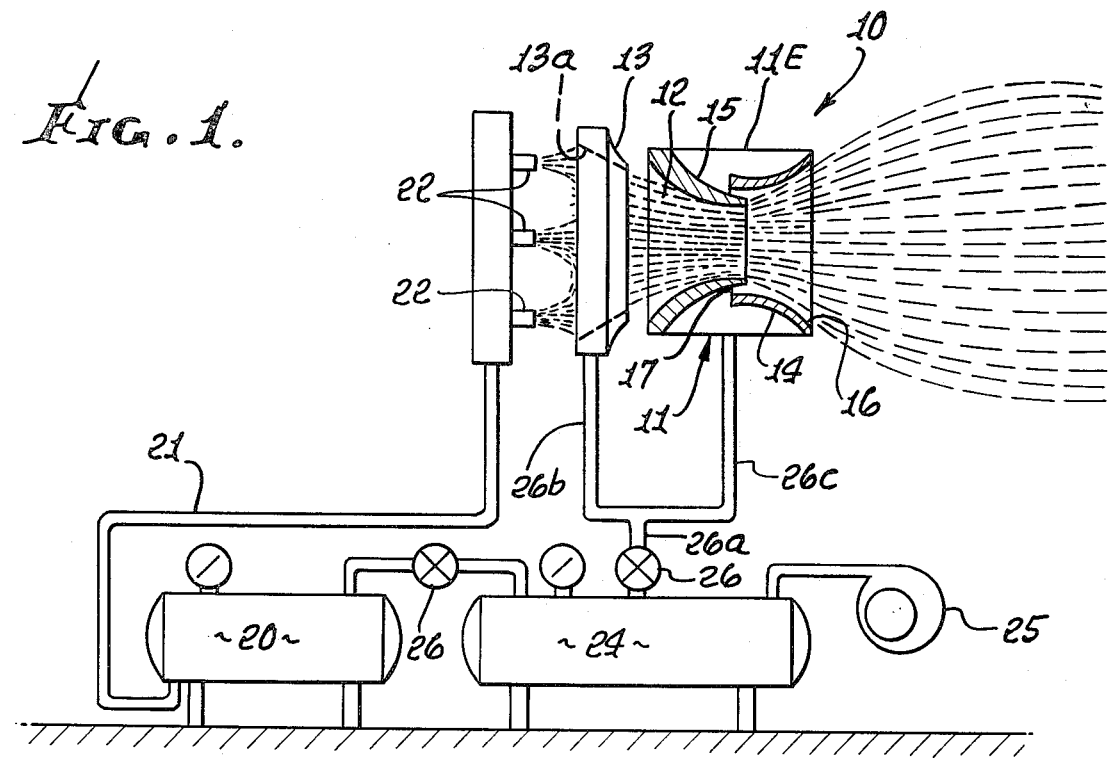
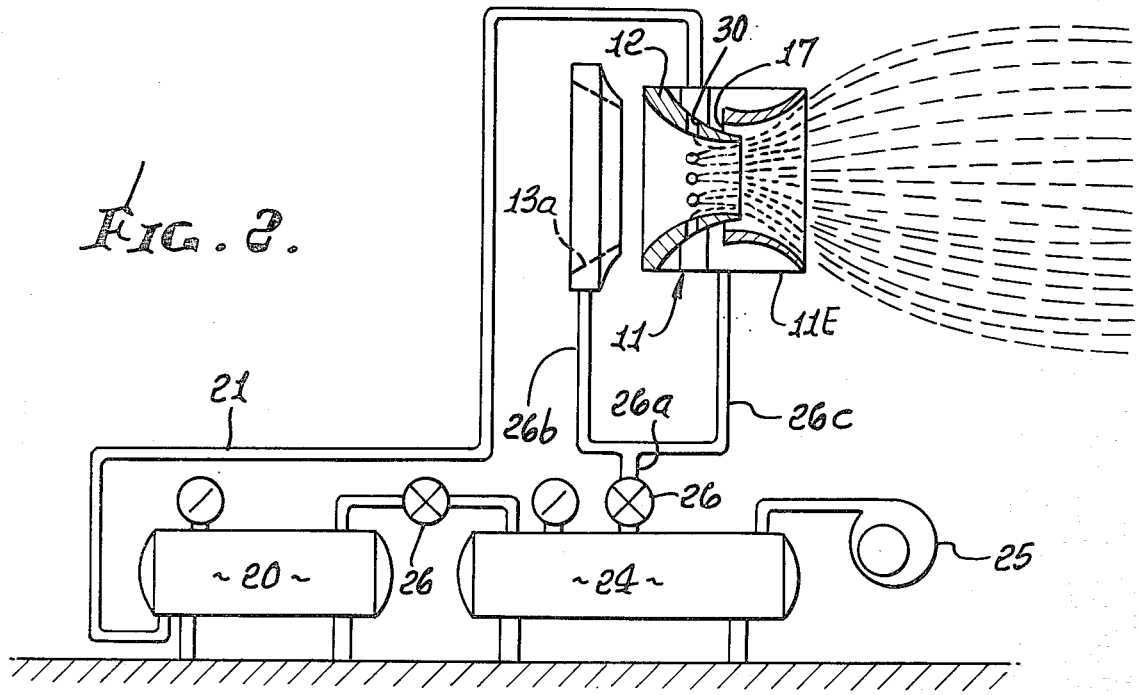

METHOD AND APPARATUS FOR SPRAYING

FIELD OF INVENTION

This invention relates to a method and apparatus for dissemination of an aerosol comprising small liquid or solid particles that are projected over relatively large distances as a spray from the site of the apparatus.

CROSS REFERENCE TO RELATED APPLICATIONS

This application is related to my earlier filed copending application bearing Ser. No. 116,649, and entitled "Jet Diffuser Ejector", now U.S. Pat. No. 4,332,529 granted on June 1, 1982.

BACKGROUND OF INVENTION

Conventional spray nozzles are devices which cause a pressurized liquid to be discharged through one, or an array, of small orifices into still air. The liquid is generally pressurized within a tank, which contains the liquid prior to entering the nozzle, and the distance reached by the spray is determined by the pressure in the tank and the drag force of the particles, or droplets, of the sprayed substance. The drag force is dependent upon the character of the spray. For example, a jet of liquid, such as that produced by a conventional hose, can traverse large distances, since the sprayed substance encounters a drag force only on its interface with the environment. However, if the spray is a fine mist consisting of small droplets or (a) finely dispersed powder, each particle encounters a drag force and is rapidly decelerated to zero velocity. Thus, the distance traversed by such fine mist aerosols using conventional spray devices is small. Examples of such prior art sprayers are land based sprayers, and sprays dropped from aircraft to cover large areas.

SUMMARY OF INVENTION

The present invention provides an improved method and apparatus for spraying aerosols comprising small liquid, or solid, particles as a fine mist over large distances on the order of 120 feet or more, while using minimal amounts of energy. No other apparatus is known to me that is capable of achieving the equivalent dissemination of the aerosols as a wide angle spray nozzle. The method and apparatus of the present invention advantageously utilizes the properties of the ejector normally employed for momentum or thrust augmentation for dissemination of the liquid and solid aerosols over large distances, and with large divergence angles, on the order of 45 degrees. The utilization of the ejector provides a means for increasing the momentum of the mixed fluids to larger values than can be achieved by jets or fans utilizing the same amount of energy. The mixing process in an ejector can be further utilized to divide a jet stream of spray substances into a more finely divided aerosol. The present invention, contrary to presently known devices and methods, causes a substance to be sprayed to mix with a high velocity jet, thus causing an acceleration of the substance in the desired direction, utilizing the drag force for projection over large distances rather than for deceleration and small spray distances, as in conventional spray apparatus. It is conceivable that the method and apparatus of the present invention will eliminate the need for aerial spraying since the invention is more efficient and covers a more precise area.

From a method standpoint, the present invention comprises a method of disseminating an aerosol either in the form of small liquid or solid particles which includes the steps of providing an ejecting structure of a preselected ejecting configuration useful for momentum augmentation of a fluid conveyed therethrough. The steps include operating the ejecting structure in a conventional fashion for momentum augmentation by injecting pressurized fluids to flow therethrough to be discharged from one end thereof while introducing a preselected spray substance into the ejecting structure to be mixed with the ejector fluids to cause the aerosol to be accelerated towards the discharge end of the ejecting structure to cause a mixture to be projected from the outlet end over a large distance from the discharge end of the ejecting structure into a more finely divided aerosol.

From an apparatus standpoint, the present invention comprises apparatus for spraying, including an ejector having a converging inlet section and a diffusing section downstream from the inlet section for diffusing the mixed fluids and an aerosol to be sprayed. Primary injection nozzle means is provided for the ejector and is arranged in a preselected spaced relationship with the ejector inlet section for directing the flow of pressurized fluid to flow into the ejector and permitting a flow of ambient fluid to be induced into the injector to be mixed with the fluid injected into the ejector to thereby provide the mixed core fluids. Means are also provided for introducing an aerosol to be sprayed into the flow field of the pressurized primary flow to be mixed therewith and to be conveyed through the ejector therewith. The diffusing section of the ejector is constructed and defined to comprise a solid upstream diffusing section and a solid downstream diffusing section having a large fluid outlet to fluid inlet area ratio in a relatively small length in the direction of thrust through the provision of a large divergent angle in excess of 7° to 8° for the solid surfaces. The diffusing section includes diffuser jet means arranged intermediate the upstream and downstream diffusing sections for introducing a thin, high speed, jet stream completely surrounding the periphery of the ejector into the diffusing section, along the diffuser solid wall to prevent separation in the downstream diffusing section between the mixed core fluids and the diffuser wall and to prevent separation between the diffuser jet stream and the core fluids and to cause the core fluids and mixed aerosols to diffuse beyond the end of the downstream diffusing section so as to cause it to continue to diverge beyond the end and to cause the aerosol to be discharged as a fine mist from the diffusing section outlet along with said fluids. The ejector further includes means for supplying a pressurized fluid to the primary injection means and the diffuser jet means.

These and other features of the present invention may be more fully appreciated when considered in the light of the following specification and drawings in which:

BRIEF DESCRIPTION OF THE DRAWINGS

FIG. 1 is a diagrammatic representation of the spraying apparatus employing a jet diffuser ejector wherein the substance to be sprayed is introduced into the inlet of the ejector through an array of jets or spray nozzles and embodying the present invention;

FIG. 2 is a diagrammatic representation of another embodiment of the spraying apparatus, similar to FIG. 1, but wherein the substance to be sprayed is in the form of a liquid aerosol and is introduced into the ejecting structure by means of an array of holes, slots, or nozzles within the ejector body for introduction into the flow field of the ejector;

DETAILED DESCRIPTION OF THE PREFERRED EMBODIMENT

Figure 3:
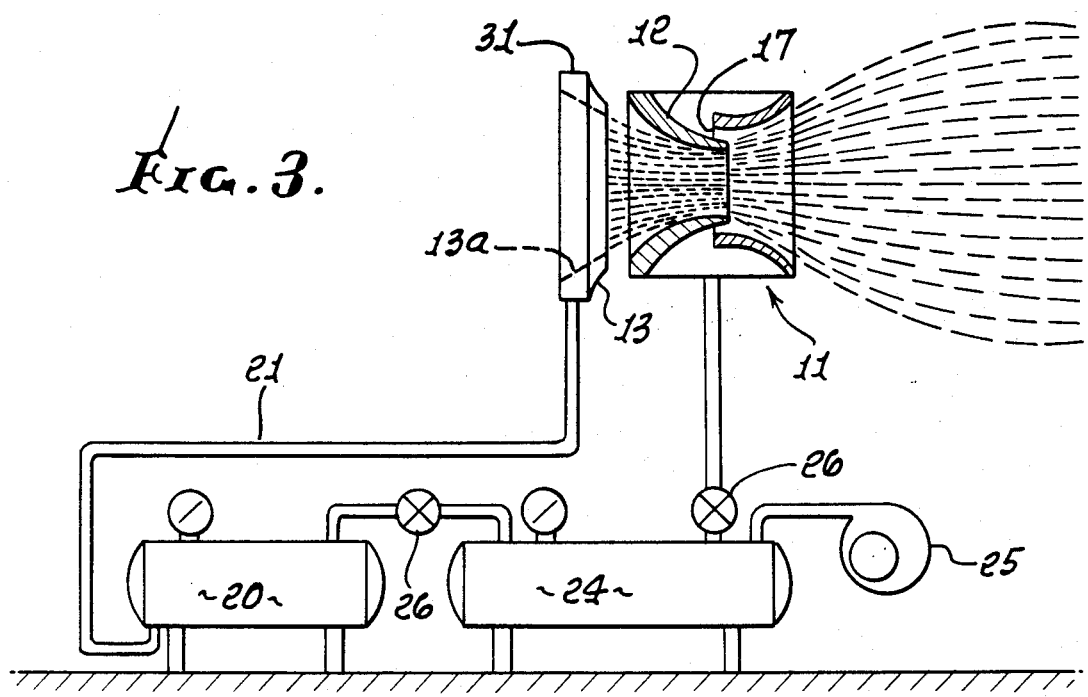
FIG. 3 is a diagrammatic representation of yet another embodiment of the spraying apparatus wherein a liquid aerosol is intermingled with the primary fluid source for the ejector and injected through the primary nozzles for the ejector along with the energized primary fluid.

In order to better appreciate my present invention, an understanding of the jet diffuser ejector structure and operation, as disclosed in my copending application, Ser. No. 116,649, mentioned hereinabove, will be first described. The jet diffuser ejector disclosed in said copending application is a preferred ejector for use as a spraying device in accordance with the teachings of the present invention, although conventional ejectors may also be used. The principle characteristics of the jet diffuser ejector disclosed in said copending application is that, relative to conventional ejectors, it has a relatively short length in the thrust direction of the ejector with a diffusing section having relatively large angles of divergence greater than 7° to 8° so as to cause the discharged fluids to diffuse beyond the end of the solid surface. This can cause divergence of the discharge fluids to one-half angles as large as 60° without adverse effects on performance. The important feature of the jet diffuser ejector for the purposes of the present invention is the construction of the diffusing section of the ejector. The diffusion section comprises upstream and downstream solid sections and a jet diffuser. The downstream solid diffusing section has a large area ratio and divergence angle as large as possible that can be utilized in a particular application. The diffuser jet comprises a nozzle incorporated into the downstream solid diffuser surface to introduce a fluid jet to prevent separation from the solid wall downstream of the jet. The diffuser jet fluid forms a jet sheet, increasing the effective diffuser area ratio and causing all of the mixed fluids to diffuse beyond the solid diffuser surface in a jet diffuser.

The inlet section of the ejector is a converging duct in which the primary fluid injection means is spaced in a preselected relationship with the inlet section. The spacing of the primary injection means from the inlet section is arranged so that ambient fluid will be induced into the ejector between the ejector wall and the primary injection means, as is more or less conventional. For a more detailed understanding of the jet diffuser ejector, reference may be made to my aforementioned copending application and which disclosure is incorporated herein by reference.

Now referring to FIG. 1, a spray apparatus 10 illustrated therein will be described in detail. The spray apparatus 10 utilizes the jet diffuser ejector 11, which is the subject of my aforementioned copending patent application referenced hereinabove. The jet diffuser ejector 11 is shown, but not limited to, circular configuration and is illustrated with a converging inlet section 12 for receiving pressurized fluid from an annular primary injection means 13 arranged in a preselected spaced relationship with the ejector inlet section to direct the flow of pressurized fluid into the ejector 11. The pressurized fluids from the primary injection means cause the ambient fluid to be induced into the ejector 11 to be mixed with the fluid injected into the ejector to thereby provide the mixed core fluids. The diffusing section of the ejector 11 is constructed and defined to comprise a solid upstream diverging section 15 and a solid downstream diverging section 16 having a large fluid outlet to fluid inlet ratio in a relatively small length in the direction of thrust through the provision of the large divergent angles in excess of 7° to 8° for the solid surfaces. The diffusing section 14 includes diffuser jet means 17 arranged intermediate the upstream and downstream diffusing sections 15 and 16 for introducing a thin, high speed jet stream, completely surrounding the periphery of the ejector into the diffusing section along the diffuser solid wall to prevent separation in the downstream diffusing section between the mixed core fluids and the diffuser wall and to prevent separation between the diffuser jet stream and the core fluids whereby the core fluids diffuse beyond the end of the downstream diffusing section 14 so as to cause the fluids to continue to diverge beyond the solid end thereof. The jet diffuser ejector 11 illustrated in FIG. 1 is illustrated of a circular configuration and the diffusing jet means is illustrated as the openings in the diffuser wall to permit the diffusing jet stream to be introduced into the diffusing section along the diffuser solid wall. For this purpose, the ejecting structure 11 is provided with an enclosure 11E for receiving the diffusing fluid therein for introduction into the ejector by the jet means 17. This is an exemplary construction of a jet diffuser ejector. The most appropriate primary injection means 13 will depend upon the type of spray substance to be utilized in the spray apparatus 10 and the location of the introduction of the substance to be sprayed into the flow field of the ejector. It is, of course, desirable to avoid impingement of the substance to be sprayed upon any solid surfaces of the primary nozzles or other ejector components.

With respect to the spray apparatus 10 of FIG. 1, the apparatus is illustrated as it may be utilized for using a liquid spray substance introduced at the inlet region of the ejector 11. To this end the spray substance is contained in a pressurized tank 20 and is conveyed by a conventional conduit 21 to conventional spray nozzles 22 at the inlet region of the ejector 11. To this end the spray nozzles 22 spray the liquid spray substance through the opening 13a of the means 13 to be conveyed into the inlet region of the ejector 11 so as to be mixed with the pressurized fluid of the primary injection means 13 and the induced flow and thereby introduced into the ejector 11 in a mixed relationship with the ejector fluids to be conveyed through the ejector 11, as illustrated in FIG. 1. The storage tank 20 can be pressurized by being connected to a pressure vessel 24 used to energize the ejector 11, or by separate means, if it is more convenient. The primary nozzle 13 illustrated in FIG. 1 comprises an annular primary nozzle arranged to minimize impingement of a spray substance on the solid surface of the primary nozzle 13. The primary nozzle 13 and the diffuser jet 17 are supplied with compressed fluid or air from a pressure vessel 24 which is supplied by a compressor 25. The supply lines for the tank 20 and the pressure vessel 24 contain valves 26 for use in controlling the pressure at the primary nozzle and diffuser nozzle and maintaining the pressure while the system is not in use. One such valve 26 is connected in serial relationship with the pressure vessel 24 in the fluid conduit branch conveying the pressurized fluid to the primary nozzle 13 and the jet diffuser 17. For this purpose, the conduit 26a coupled to the valve 26 comprises branches 26b and 26c coupled to the primary injection means 13 and diffusing injecting means 17, respectively. Similarly, the conduit communicating between the vessels 20 and 24 is provided with a control valve 26. The entire spray apparatus 10 illustrated in FIG. 1 can be mounted on a truck or other vehicle for transportation to the area to be sprayed, or may be located in a fixed location. The operation of the spray apparatus 10 of the present invention will now be described. To this end it will be recalled that the pressurized fluid from the pressure vessel 24 is coupled through the valve 26 to the primary injection means 13 and the diffuser jet means 17. This will cause these fluids to be introduced into the ejector 11 and flow through the ejector to be discharged at the opposite end thereof. The liquid spray substance stored in the tank 20 at this time is conveyed through the conventional spray nozzles 22 to be introduced directly into the inlet section of the ejector 11. It should be understood that the spray substance could be a liquid and can be introduced through a water jet (not shown). With the introduction of the liquid spray substance into the ejector 11 it is mixed with the ejector fluids and accelerated through the ejector by means of the mixed core fluids to be conveyed towards the discharge end thereof. At the diffusing end of the ejector 11 the spray substance is more finely divided (as illustrated) and continues to diverge along with the core fluids beyond the solid end of the ejector 11 to be disseminated over a relatively wide area and a large distance with regard to the location of the ejector 11.

With the above structure in mind, it should be noted that a liquid spray substance can be introduced at virtually any region of the flow field of the ejector 11. If the liquid is best injected as a jet (as from a hose nozzle), it can be best broken up into fine mist aerosol by introduction into the inlet of the ejector 11 where it will be divided into small droplets by the mixing process of the ejector. If it can be sprayed, as from conventional spray nozzles, it also can be introduced into the inlet of the ejector 11 at any region within the ejector duct, or with the primary fluid prior to the primary nozzle injection. Solid particles or viscous, or adhesive liquid spray substances, are best introduced into the inlet region of the ejector 11 to avoid clogging of the ejector nozzles. The jet diffuser ejector 11 can project widely diverging sprays over large distances with a variety of configurations for the primary injection means.

Another embodiment of the invention is illustrated in FIG. 2 wherein the spray substance is injected into the flow field of the ejector 11 downstream from the primary nozzle means 13. For this purpose the spray substance is derived from pressurized tank 20 as in the previous embodiment, and conveyed by means of the conduit 21 to the ejector 11. The ejector 11, as in the embodiment of FIG. 1, has the volume surrounding the ejector 11 enclosed by the enclosure 11E to receive the pressurized diffuser jet fluid to be injected by means of the diffuser jet 17. In this embodiment the enclosure 11E for the ejector 11 is the same, except that the conduit 21 is coupled thereto so that the spray substance from the tank 20 may be injected into the flow field of the ejector 11 through apertures of preselected configurations or nozzles 30 into the flow field of the ejector downstream from the primary injection means 13. This arrangement may also include injecting the substance to be sprayed by means of the diffuser jet 17. The remaining arrangement for providing the primary pressurized fluids and the jet diffusing fluids is as illustrated and described in conjunction with FIG. 1. The apparatus and method embodied in FIG. 2 avoids the use of external spray substance injection means and is less subject to handling damage, but may require maintenance for clearing the spray substance injection apertures if viscous or adhesive substances are to be sprayed.

The embodiment illustrated in FIG. 3 is basically the same as that illustrated in conjunction with FIGS. 1 and 2, except that the aerosol, or substance to be sprayed, is introduced by means of the primary injection means 13 and as a component of pressurized primary fluid. For this purpose the substance to be sprayed, or the aerosol, is mixed with the pressurized primary fluids stored in the pressure vessel 20 prior to being conveyed to the primary nozzle 13, or may be injected directly into the primary duct 31 at any region upstream of the primary nozzle 13. The operation is the same as in the previous embodiments with regard to conveying the substance to be sprayed through the ejector 11 and disseminating the spray substance over a relatively wide angle at a large distance in the form of a fine mist, as illustrated in FIG. 3.

Figure 4:
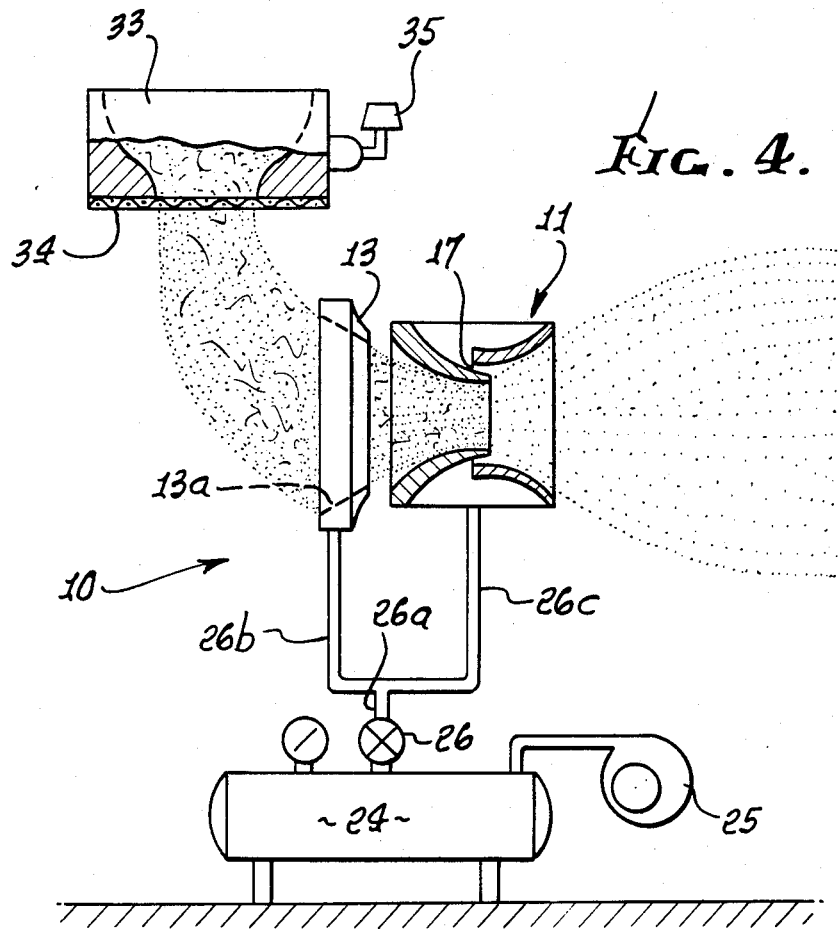
FIG. 4 is a diagrammatic representation of a further embodiment of the spraying apparatus wherein the apparatus is adapted for spraying solid particles arranged at a position above the inlet for the ejector.

The spray apparatus 10 illustrated in FIG. 4 is capable of spraying aerosols consisting of solid particles in a gaseous matrix, and one such apparatus for accomplishing this is illustrated in FIG. 4. In this embodiment the sprayed substance may be generated or stored in a tank 33 located above the ejector flow field in the manner illustrated in FIG. 4. The solid substances will fall, due to gravitational forces, or be blown by pressure forces, from their storage position within the tank 33 and be conveyed through the opening 13a of the annular injection means 13; see FIG. 4. A fine screen 34 may be provided at the outlet end of the tank 33 to permit the substances to approach the inlet of the ejector 11. It may be desirable to provide a vibrator 35 coupled to the tank 33 to assure the solid particles passing through the screen 34. Although the tank 33 is illustrated in an elevated position with regard to the ejector 11, it may be located below the inlet of the ejector 11 or any location near the inlet of the ejector, depending on the characteristics of the solid particle aerosol to be sprayed. To this end a heated substance such as smoke will rise from the tank below the ejector to approach the inlet and be dispersed. Other solid particle aerosols can be blown upwards or horizontally towards the inlet of the ejector to be introduced in the ejector in that fashion.

Figure 5:
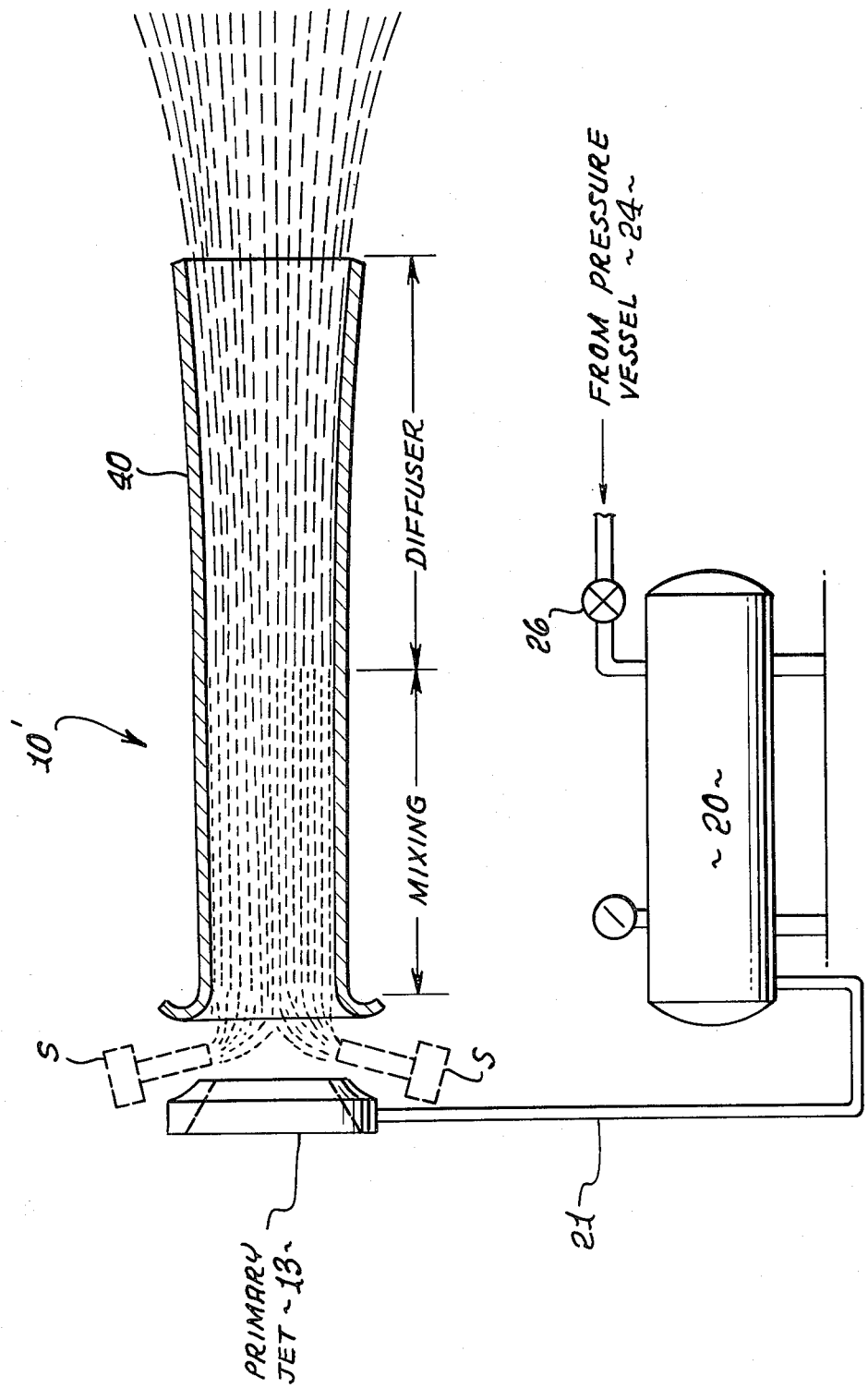
FIG. 5 is a diagrammatic representation of the spraying apparatus utilizing a conventional, solid diffusing type of structure.

Now referring to FIG. 5, a spraying apparatus 10' utilizing a conventional solid diffusing type of ejector 40 will be described.

Initially, the configuration of the ejector 40 should be considered. Ejector 40 has a converging inlet section for receiving the primary pressurized fluids to be conveyed through the ejector 40. A relatively straight section adjacent the inlet section is utilized for mixing the primary jet fluids and the fluids induced into the ejector 40 by means of the space between the primary jet 13 and the inlet section of the ejector 40. The diffusing section consists of a relatively long, solid diverging section, but wherein the divergence angle is generally below 7° to 8° for the solid surface of the diffusing section so as to guide the mixed fluids therealong without detaching from the diffusing wall. The fluids are then discharged from the end of the ejector 40. This structure limits the transverse dimension of the discharged fluid to that of the exit section of the ejector 40. The characteristic of the ejector 40 is that the angle of divergence is much narrower than in the jet diffuser ejector 11 and the divergence of the spray cannot be of as large an angle as with the jet diffuser ejector. The arrangement of the spray substance for the apparatus 10' is similar to that described in conjunction with FIG. 3, namely, that the substance to be sprayed is initially in the tank 20 and conveyed to the primary nozzle means 13 by means of the conduit 21 so as to be injected into the ejector 40 to be conveyed therealong and discharged at the terminal end thereof. Also, as indicated in FIG. 5 in dotted outline, the spray substance may be introduced into the ejector 40 by means of an array of nozzles S arranged around the inlet section for introducing a spray substance therein. Other arrangements for introducing the spray substance into the ejector 40 may be utilized as described in conjunction with FIGS. 1 through 4. This would include providing apertures in the walls of the ejector 40 and introducing a spray substance in that fashion to be mixed with the pressurized primary flow.

The present invention has advanced the state of the art for spraying substances by utilizing ejecting structure to spray substances over relatively large distances and wide angles in a finely dispersed mist. In testing the spray apparatus, an axially symmetric jet diffuser ejector was utilized having a two inch diameter at its throat, or inlet section, diverging to a 3.2 inch diameter at the discharge end of the ejector where its surface has a divergence angle of 45 degrees The overall length of the jet diffuser ejector in the flow direction was 4.8 inches, including the primary injection means and the ejector body. Spray distances vary with the size of the primary injection nozzle area and with the fluid pressure so that spray distances as large as 120 feet have been achieved.

I claim:

1. A method of disseminating a spray substance comprising small liquid or solid particles or a liquid jet comprising the steps of providing an ejecting structure of a preselected ejecting configuration useful for momentum augmentation of a pressurized fluid conveyed therethrough, operating the ejecting structure in the conventional fashion for momentum augmentation by injecting pressurized fluids at a preselected point spaced from the ejecting structure and adjacent one end thereof for inducing an ambient flow into the ejecting structure to be mixed with the pressurized fluids and to flow therethrough and to be discharged from the other end thereof and introducing a preselected spray substance into the ejecting structure to be mixed with the ejector fluids to cause the spray substance to be accelerated toward the discharge end of the ejecting structure to cause the mixture to be projected over a large distance from the discharge end of the ejecting structure and into a more finely divided form.

2. Apparatus for spraying including an ejector having a converging inlet section and a diffusing section downstream from the inlet section for diffusing the fluids conveyed therethrough and a substance to be sprayed, primary injection nozzle means arranged in a preselected spaced relationship with the ejector inlet section for introducing and directing a flow of pressurized fluid supplied thereto to flow into the ejector and permitting a flow of ambient fluid to be induced into the ejector to be mixed with fluid injected into the ejector to thereby provide a mixture of said fluids, means for introducing a substance to be sprayed into the flow field of the mixed fluids to be mixed therewith and to be conveyed through the ejector therewith, the diffusing section of the ejector is constructed and defined to comprise a solid upstream diverging section and a solid downstream diverging section having a large fluid outlet to fluid inlet area ratio in a relatively small length in the direction of thrust through the provision of a large divergent angle in excess of 7° to 8° for the solid surfaces, the diffusing section including diffuser jet means arranged intermediate the upstream and downstream diffusing sections for introducing a thin, high speed jet stream completely surrounding the periphery of the ejector into the diffusing section along the diffuser solid wall to prevent separation in the downstream diffusing section between the mixed core fluids and the diffuser wall and to prevent separation between the diffuser jet stream and the core fluids and to cause the core fluids and mixed spray substance to diffuse beyond the end of the downstream diffusing section so as to cause it to continue to diverge beyond said end, and to cause the spray substance to be discharged as a fine mist from the diffusing section outlet along with said fluids, and means for supplying a pressurized fluid to the primary injection means and the diffuser jet means.

3. A method for disseminating a spray substance comprising small liquid or solid particles or a jet stream including the steps of providing an ejecting structure, arranging injection means at a preselected spaced relationship with the sides of the inlet section of the ejecting structure, injecting a pressurized fluid into the ejecting structure through the injection means to cause the injected fluid to mix with the ambient fluid induced into the ejecting structure through the space between the injection means and the ejecting structure, introducing a spray substance into said ejecting structure to be mixed and conveyed through the ejector with said fluids, providing a relatively large angle in excess of 7° to 8° adjacent the outlet end of the ejector, providing diffusing jet means for the ejecting structures downstream of the injection means for diffusing the mixed fluids and avoiding separation between the mixed fluids and a diffusing fluid in the downstream ejecting structure diffusing section, the diffusing jet means injects a thin, high speed, jet stream completely surrounding the periphery of the ejector and flowing into the diffusing section to prevent fluid detachment in the diffusing section and to cause the mixed fluids and the aerosol to diffuse and diverge beyond the large end of the diffusing section so as to be projected over a large distance from said end of the diffusing section, and injecting a diffusing fluid into the diffusing jet means.

4. A method for disseminating a spray substance comprising small liquid or solid particles, as defined in claim 3, wherein the step of introducing a spray substance comprises injecting the spray substance through the injection means along with injecting a pressurized fluid through the injection means.

5. A method for disseminating a spray substance comprising small liquid or solid particles or a jet stream, as defined in claim 4, wherein the steps of injecting the spray substance comprises intermingling a liquid spray substance with the pressurized fluid injected through the injection means and injecting the spray substance and the pressurized fluid into the ejecting structure by the injection means.

6. A method for disseminating a spray substance comprising small liquid or solid particles or a jet stream, as defined in claim 3 wherein the step of injecting the spray substance includes the steps of mixing the spray substance with a pressurized fluid to be injected into the ejecting structure, and then injecting the mixed spray substance and pressurized fluid into the ejecting structure through the injection means.

7. A method for disseminating a spray substance comprising small liquid or solid particles or a jet stream, as defined in claim 3, wherein the step of injecting the spray substance includes the step of injecting the spray substance into the ejecting structure upstream of the injection means.

8. A method for disseminating a spray substance comprising small liquid or solid particles or a jet stream, as defined in claim 7, wherein the spray substance is injected through the space between the injection means and the inlet section of the ejecting structure.

9. A method for disseminating a spray substance comprising small liquid or solid particles or a jet stream, as defined in claim 7, wherein the spray substance is injected by means of preselected apertures within the ejecting structure.

10. A method for disseminating a spray substance comprising small liquid or solid particles or a jet stream, as defined in claim 7, wherein the spray substance is injected by means of the diffusing jet means.

11. Apparatus for spraying comprising an ejector adapted for momentum augmentation having a converging inlet secton for mixing fluids and a diffusing section downstream from the inlet section, means arranged in a preselected spaced relationship with the ejector inlet section for injecting a primary flow of pressurized fluid to flow into the ejector and permitting a flow of ambient fluid to be induced ito the ejector through the space between said means and the inlet section to be mixed with the fluid injected into the ejector to thereby provide the mixed core fluids, means for introducing a substance into the fluid field the mixed core fluids to be mixed and conveyed therewith through the ejector, the diffusing section comprising an upstream solid diffusing section for receiving the mixed core fluids and the spray substance and a downstream solid diffusing section, diffusing jet means arranged in the diffusing section intermediate the upstream and downstream diffusing sections, the solid diffusing sections being constructed and defined for avoiding flow separation with the wall of the diffusing section while achieving the largest possible area ratio with a minimal length in the thrust direction and with a minimal expenditure of momentum and energy of the primary fluid, the diffuser jet injecting a high speed, thin diffuser fluid jet sheet of the same type of fluid as the primary flow into the solid downstream diffusing section for preventing fluid separation of the mixed core fluids from the solid wall of the downstream diffusing section and for mixing with the core flow to cause both the core fluids and mixed jet sheets to diffuse beyond the solid downstream diffusing section to thereby provide said large area ratio on a short solid diffusing section to thereby cause the spray substance to be projected as a fine mist over relatively large distances from the ejector.

12. Apparatus for spraying as defined in claim 11 wherein said means for introducing a spray substance includes means for introducing a spray substance into the inlet section of the ejector along with the primary pressurized fluid to be introduced into the ejector therewith.

13. Apparatus for spraying as defined in claim 11 including means for mixing a spray substance along with the pressurized fluid, and means for conveying the mixture of the pressurized fluid and the spray substance to said means for injecting the primary flow of pressurized fluid to cause said mixture to flow into the ejector.

14. Apparatus for spraying as defined in claim 11 wherein said ejector has a circular cross-sectional configuration and is provided with a plurality of aperture means for introducing the spray substance into the ejector.

15. Apparatus for spraying as defined in claim 14 wherein said aperture means includes said diffuser jet means.

16. Apparatus for spraying as defined in claim 11 wherein said spray substance comprises solid particles and includes means for storing said spray substance at a position spaced above the inlet of the ejector to emit the spray substance from the storing means to cause the spray substance to flow into the inlet of the ejector by gravitational forces.

17. Apparatus for spraying as defined in claim 11 wherein said spray substance comprises solid particles and includes means for storing said spray substance at a position spaced below the inlet for the ejector to emit the spray substance to cause the spray substance to rise towards the inlet of the ejector and to enter the ejector thereby.

18. A method of disseminating a spray substance comprising small liquid or solid particles or a jet stream including the steps of providing an ejecting structure useful for momentum augmentation of a pressurized fluid conveyed therethrough and having a converging inlet section and a diffusing section downstream from the inlet section for diffusing the fluids conveyed therethrough and to be discharged therefrom, arranging injection means at a preselected spaced relationship with the sides of the inlet section of the ejecting structure, and adjacent the inlet section injecting a pressurized fluid into the ejecting structure through the injection means to cause the injected fluid to mix with the ambient fluid induced into the ejecting structure through the space between the injection means and the ejecting structure and to be discharged from the diffusing section and introducing a spray substance to be disseminated into said ejecting structure to be intermingled with the mixed fluids and to be conveyed through the ejecting structure and to be discharged therefrom as a spray substance along with the mixed fluids.

19. A method of disseminating a spray substance as defined in claim 18 wherein the step of introducing a spray substance comprises injecting the spray substance through the injection means along with injecting a pressurized fluid through the injection means.

20. A method of disseminating a spray substance as defined in claim 19 wherein the step of injecting the spray substance comprises intermingling a liquid aerosol with the pressurized fluid injected through the injection means and injecting the aerosol and the pressurized fluid into the ejecting structure by the injection means.

21. A method of disseminating a spray substance as defined in claim 19 wherein the step of injecting the spray substance includes the steps of mixing the spray substance with a pressurized fluid to be injected into the ejecting structure, and then injecting the mixed spray substance and pressurized fluid into the ejecting structure through the injection means.

22. A method of disseminating a spray substance as defined in claim 19 wherein the step of injecting the spray substance includes the step of injecting a spray substance into the ejecting structure upstream of the injection means.

23. A method of disseminating a spray substance as defined in claim 22 wherein the spray substance is injected through the space between the injection means and the inlet section of the ejecting structure.

* * * * *